No. 779,702. PATENTED JAN. 10, 1905.
S. W. FULLER.
PNEUMATIC TIRE FOR VEHICLES.
APPLICATION FILED JUNE 1, 1903.
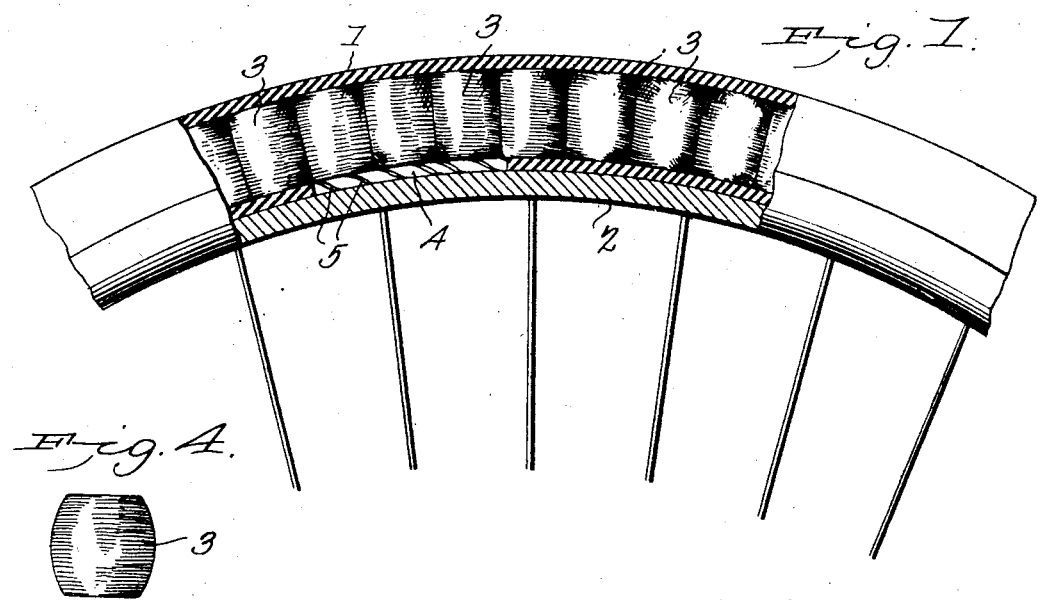
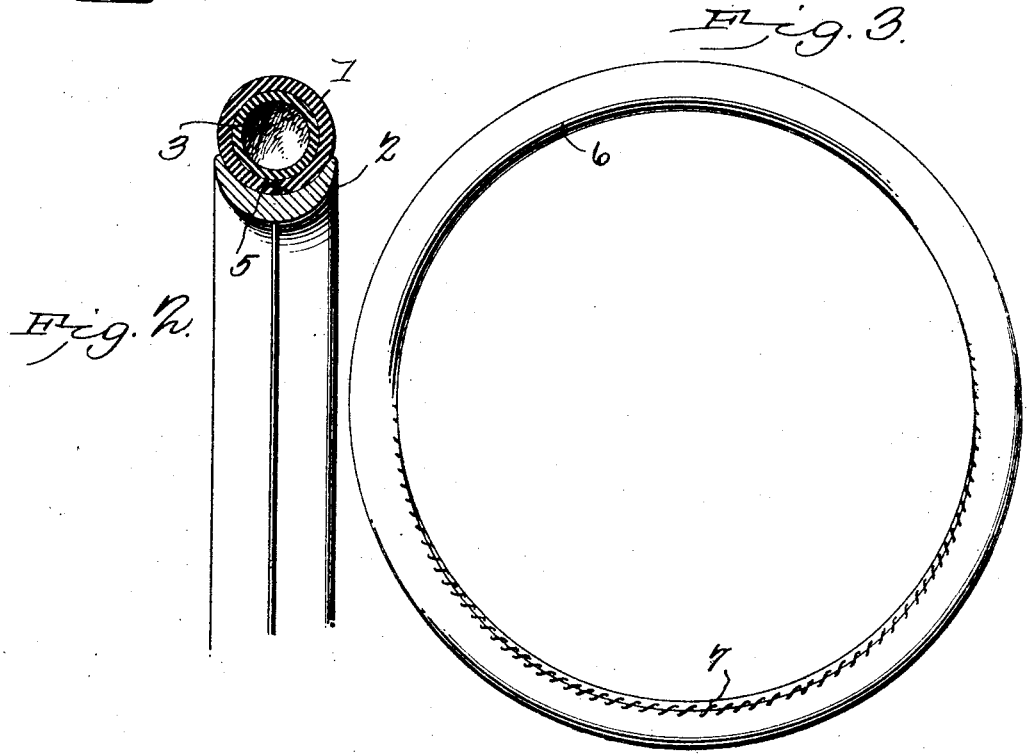

No. 779,702.

Patented January 10, 1905.

UNITED STATES PATENT OFFICE.

SAMUEL W. FULLER, OF MALDEN, MASSACHUSETTS.

PNEUMATIC TIRE FOR VEHICLES.

SPECIFICATION forming part of Letters Patent No. 779,702, dated January 10, 1905.

Application filed June 1, 1903. Serial No. 159,583.

*To all whom it may concern:*

Be it known that I, SAMUEL W. FULLER, a citizen of the United States, residing at Malden, in the county of Middlesex and State of Massachusetts, have invented a new and useful Pneumatic Tire for Vehicles, of which the following is a specification.

This invention relates to pneumatic tires for vehicles, and more especially to pneumatic tires in which the air compressed within the tire is contained within a plurality of non-communicating chambers in order that the puncture of one of the air-containing chambers with the consequent escape of the air therefrom may not cause a complete collapse of the tire.

The object of the invention is to provide an improved form of pneumatic tire of the class described in which the means for containing the air which maintains the elasticity of the tire is so arranged that the tire may be punctured in one or more places and the air allowed to escape from sections of the tire without materially lessening its elasticity and ability to support the vehicle upon which it is used.

With the above-stated object in view the invention consists, generally speaking, in an outer tube or sheath containing a plurality of imperforate elastic rubber bulbs filled with air and forced into the outer tube or sheath under pressure, a sufficient number of bulbs being introduced within the outer tube or sheath to form an elastic cushion of sufficient tension to support the weight of the vehicle upon the tire.

In describing the invention reference will be had to the accompanying drawings, in which are shown two embodiments of the invention, each susceptible of carrying the same into practical operation, it being understood that changes in the form, proportions, and exact mode of assemblage of the elements exhibited may be made without departing from the spirit of the invention or sacrificing any of its advantages.

In the drawings, Figure 1 is a view in longitudinal section through a portion of a tire constructed in accordance with this invention, a portion of the wheel being shown in relation to the tire. Fig. 2 is a transverse section through the tire shown in Fig. 1. Fig. 3 is a view in perspective of a slightly-modified form of tire. Fig. 4 is a side elevation of the preferred form of bulb before introduction into the tire.

Corresponding parts are designated by the same characters of reference in the several views in which they appear.

Referring to the drawings, 1 designates the outer tube or sheath of the tire, which may be made in any approved manner of the materials ordinarily employed in constructing the outer tubes or sheaths of pneumatic tires—such, for example, as a plurality of plies of fabric cemented together and coated, both inside and out, with rubber.

2 designates a wheel upon which the tire is supported, and 3 3 designate a plurality of rubber bulbs, normally of the contour shown in Fig. 4, which are filled with air and forced into the tire at a suitable opening therein, as 4. The bulbs 3 are made hollow, of elastic and comparatively thin rubber, are imperforate, and contain air inclosed within them at the time of manufacture.

In order to facilitate the insertion of the air-filled bulbs 3 into the outer tube 1, the inner surface of the tube 1, as well as the outer surface of the bulbs 3, should preferably be sprinkled with pounce or pulverized talcum, so as to diminish as far as possible the friction caused by the travel of the bulbs along the inner surface of the outer tube.

When a sufficient number of bulbs 3 have been forced into the outer tube or sheath 1 to produce the desired degree of tension within the tube, the opening 4 therein is closed by a lacing 5 or other suitable means, and the tire is then in condition for use.

It has been determined by experiment that an oblate spheroidal form is the most effective shape for the bulbs, the flattened ends thereof being placed at the inner and outer peripheries of the casing or outer tube, so that when under pressure the convexed sides of adjacent bulbs will be compressed into mutual contact throughout their lengths and the outer ends of the bulbs will fit snugly and conform to the shape of the tread portion of the outer tube and constitute a substantially continuous support for the tread of the tire, thereby avoiding any irregularities in said tread portion.

When a tire constructed in the manner above described is punctured by a nail, a piece of glass, or other sharp object, the air within the bulb at the point of puncture will gradually escape; but the tension of the tire even at the point of puncture will not be materially lessened, for the reason that as the air escapes from the punctured bulb the adjacent bulbs will expand and gradually readjust themselves within the outer tube, so as to restore a substantially uniform tension throughout the tire, which, owing to the fact that only a small portion of the air contained within the tire has escaped, will be substantially as great as the original tension prior to the puncture.

In the modified form of the tire shown in Fig. 3 the outer tube (designated 6) is slit on the surface of contact with the wheel throughout the entire length of the tube, and the edges of the slit are brought together by means of a lacing 7, extending entirely around the wheel. The object of this type of construction is to afford means for removing from the tube without any difficulty any bulbs that may be punctured and introducing others in their place without disturbing the unpunctured bulbs contained within the outer tube.

With an outer tube constructed as shown in Fig. 1 it is necesssary in the event of the puncture of a bulb not accessible through the opening 4 without the removal of some of the unpunctured bulbs to remove from the outer tube a sufficient number of unpunctured bulbs to give access to a punctured bulb and after the removal of the punctured bulb in this manner to return to the outer tube all the unpunctured bulbs previously removed. As this is an operation involving the expenditure of considerable time, it is better with the form of tire first described to leave the punctured bulbs in the outer tube and simply to introduce enough unpunctured bulbs to restore any lost tension due to the puncturing of some of the bulbs originally placed within the outer tube. When the number of punctured bulbs within the outer tube has become tolerably large, all of the bulbs may be removed from the tire, the punctured bulbs discarded, and the proper number of unpunctured bulbs to give to the outer tube the desired degree of tension introduced, as in the beginning.

In the modified form of tire illustrated in Fig. 3, however, the removal of the punctured bulbs and their replacement is a matter of so little difficulty that it may be done immediately after the completion of the trip upon which a bulb has been punctured. When it is desired to replace a punctured bulb in the modified form of tire, the puncture being located, the lacing of the outer tube adjacent to the puncture will be cut and the punctured bulb removed without disturbing any of the unpunctured bulbs. A fresh bulb will then be introduced in lieu of the bulb removed and a new piece of lacing used to close the opening through which the exchange of bulbs has been effected.

Having thus described the construction and use of my invention, what I claim as new, and desire to secure by Letters Patent, is—

A pneumatic tire comprising an outer tube or casing and a series of inflated oblate spheroidal bulbs contained under pressure within the casing with their flattened ends at the inner and outer peripheries of the casing and the convexed sides of adjacent bulbs in mutual engagement throughout their lengths, the outer flattened ends of the bulbs conforming to the shape of and constituting a continuous support for the tread of the casing.

In testimony that I claim the foregoing as my own I have hereto affixed my signature in the presence of two witnesses.

SAMUEL W. FULLER.

Witnesses:
MARY P. NEWHALL,
VENIN E. SYMONDS.